Dec. 2, 1941.  E. E. ARNOLD  2,264,268
AIRCRAFT GENERATOR VENTILATING FAN COOLING MEANS
Filed Feb. 4, 1939
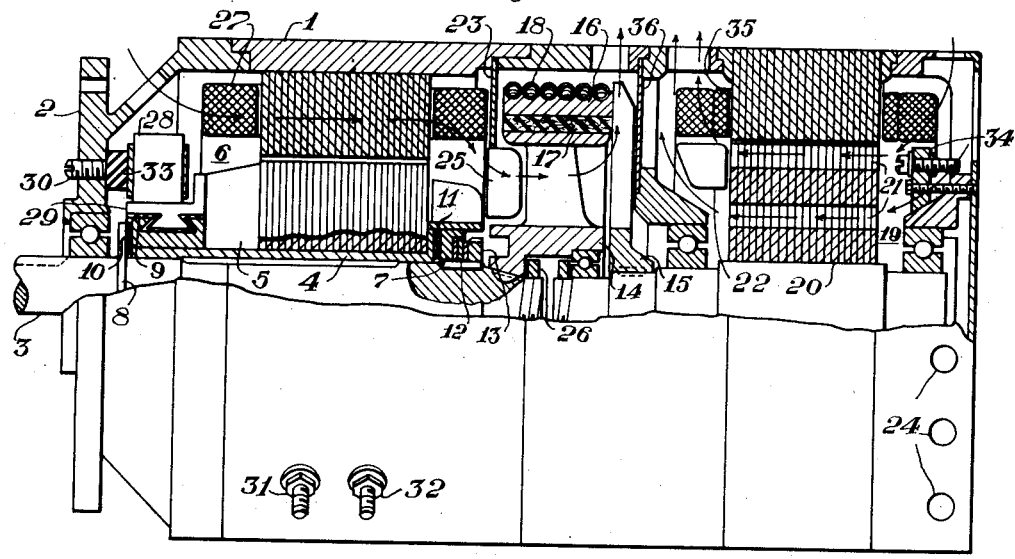
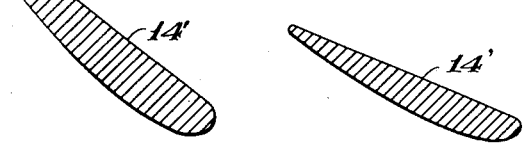
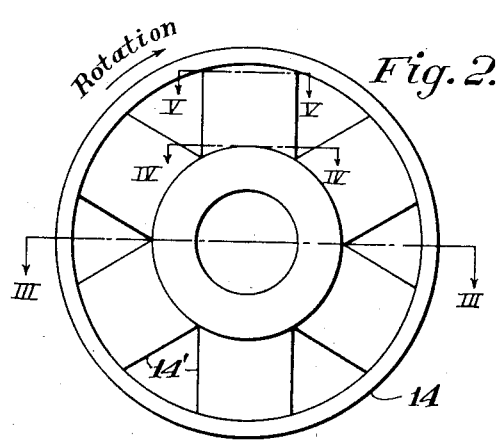
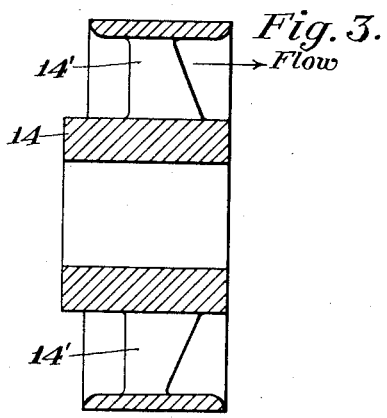
WITNESSES:
INVENTOR
Edwin E. Arnold.
BY
Paul E. Friedemann
ATTORNEY Patented Dec. 2, 1941

2,264,268

UNITED STATES PATENT OFFICE 2,264,268

AIRCRAFT GENERATOR VENTILATING FAN COOLING MEANS

Edwin E. Arnold, Pittsburgh, Pa., assignor to Westinghouse Electric & Manufacturing Company, East Pittsburgh, Pa., a corporation of Pennsylvania Application February 4, 1939, Serial No. 254,605

9 Claims. (Cl. 171—252)

My invention relates to a ventilating arrangement for a generator set which is adapted for use on an airplane, the generator set being driven by the main engine of the airplane.

One object of my invention is to provide a compact generator set which embodies an efficient ventilator but which requires no additional equipment which would add to the weight and overall dimensions of the generator set.

Another object of my invention is to design the drum which forms a slip clutch element so that it will also act as a propeller type fan.

A still further object of my invention is to provide an assembly which is simple, efficient and rugged in construction and which is comparatively small in dimension and light in weight, but yet having a high output rating.

Another object is to provide a generator set comprising two separate generators, the rotors of which are frictionally driven by a common drive shaft, the one frictional drive being for the purpose of guarding the first rotor against torque shocks, and the other frictional drive being for the purpose of governing the speed of the second rotor.

Other objects and advantages will become more apparent from a study of the following specification when considered in conjunction with the accompanying drawing, in which:

Figure 1 is a side view, partly in cross-section, of a generator set assembly embodying the principles of my invention;

Fig. 2 is a front view of the slip clutch drum or spider element;

Fig. 3 is a sectional view taken along the line III—III in Fig. 2;

Fig. 4 is an enlarged sectional view of one of the fan blades of the slip clutch drum element taken along the line IV—IV of Fig. 2; and Fig. 5 is a similar section taken along the line V—V of Fig. 2.

Referring more particularly to Fig. 1, the numeral 1 indicates a containing shell or housing having at one end a flange 2 which is adapted to be bolted onto a flange of the main engine. A splined drive shaft 3, which is driven by the main engine of the airplane, extends into the housing, and is surrounded in part by a quill 4, upon which quill an armature 5 of a direct-current generator 6 is rigidly mounted. Through the terminals 31 and 32, the field coil 27 of the generator may be energized. A brush assembly 28 slides on commutator bars 29 by means of a circumferentially slidable member extending through a slot in flange 2 which member is secured to brush assembly 28 by an insulating member 33, the position of the brush assembly may be adjusted by adjusting means 30. The rotor is rigidly clamped to the quill by means of a threaded lock nut 13. Integral with the drive shaft 3 is a collar-like member 8. At the other end of the quill is a similar collar-like member 9 which is keyed to the drive shaft, thereby allowing longitudinal displacement therewith. Interposed between the collar-like members 8 and 9 and the ends of the quill 4 are washers 10 and 11, which are preferably molded out of hard asbestos brake surface material. The whole assembly is held and pressed into driving engagement by a spring washer and lock washer 12 and a follow assembly nut 13. The purpose of this friction drive arrangement is to allay torque shock transmission from the shaft 3 to the armature 5 by allowing a small degree of angular slip between the drive shaft and armature in the event of excessive torque shock considerably above maximum operating torque, as would be encountered, for example, in "gunning" the main engine when starting or otherwise.

Such an arrangement is an improvement over the well known spring coupling which is undesirable because there are present, oscillating angular vibrations not readily damped. Rigidly secured by a nut 26 to the other end of drive shaft 3 is a drum 14, having a spider-like central structure 14' which drum forms the driving element of a slip clutch, the driven element comprising a spider 15 having attached at the ends of its radial arms a plurality of longitudinally extending, but circumferentially arranged, arms which are arranged side-by-side with a plurality of friction shoes 16 having suitable friction surfaces 17, such as molded asbestos, which frictionally engage the rim of the drum member 14. A plurality of garter springs 18 which surround the friction shoes normally urge the friction shoes radially inwardly into engagement with the rim of the drum member 14. However, when the rotational speed of the drive shaft goes above a predetermined amount, centrifugal force will urge the friction shoes radially outwardly thus tending to increase the tension on the garter springs 18 to thus decrease the contact force of the shoes on the drum 14 which results in allowing slip to occur between drum 14 and the spider member 15 thereby providing substantially constant speed control of said driven spider member 15.

It will thus be seen that this slip clutch acts as a governor and will not transmit the speeds above a predetermined maximum. Hence, the effect will be to drive the driven spider member 15 at substantially constant speed. Normally, drive shaft 3 drives at a speed somewhat greater than engine speed, where in one preferred arrangement when the engine speed is above 1600 R. P. M. for instance, the driven member 15 at a critical governing speed of 2400 R. P. M. and consequently for engine speeds in excess of 1600 R. P. M. the member 15 is caused to slip and run at a constant speed of 2400 R. P. M.

An alternating current generator 19 (preferably of such frequency as to be suitable for radio operation) is driven by member 15 at constant speed after the engine is brought up to some predetermined speed. The inductor rotor 20 of the generator 18 has a plurality of longitudinally extending slots and holes 21 through which air may be forced through for ventilating purposes in the path shown by the arrows. Attached at one end of the inductor rotor 20 are a number of circumferentially spaced fan blades 22 for supplying air ventilation of the inductor generator. A number of holes, such as 24, are arranged in the housing to permit entry of air therein. Electrical energy is led in through spider-like terminals, such as 34, to the stator coils 35 of the inductor generator. A diaphragm 36 completely blocks air passage from one generator because of their difference in speed, thus forming two separate ventilating systems.

In view of severe space limitations to the overall dimension and high output rating requirements of a generator assembly for use in an airplane, it is imperative that large quantities of air be caused to flow through all available spaces in the unit to remove heat generated in the coils, magnetic circuits, and last, but extremely important, to remove the heat developed by the slip clutch when driving at high speeds above 2400 R. P. M. To provide additional ventilation without adding to the generator set equipment by the addition of a fan, the radiating spider arms of the drum or slip clutch member 14 are shaped in the form of propeller blades which are diagonally arranged; that is, which are inclined at an angle with respect to the plane of the drum member 14, as will be obvious from an inspection of Figs. 2 to 5, inclusive. Each of the radiating arms is of "streamline" or "airfoil" cross section, as shown in Figs. 4 and 5, the angle between the fan blades and the axial plane of the drum decreasing in a radially outward direction, the range being proportioned and set to best suit the speed for which the apparatus is designed, as shown in Fig. 4, and Fig. 5.

In order to increase the efficiency of ventilating blades or spider arms 14', a plurality of circumferentially spaced substantially radially extending guide vanes 25 are provided, which guide vanes are supported by ring 23 which is secured to the housing 1. The purpose of these guide vanes is to prevent whirling eddies and induce the entering air to flow axially (i. e. longitudinally) into the path of the fan like spider arm 14. Thus it is seen that the spider 14' acts not only as a driving drum element for the slip clutch, but acts as an efficient propeller type fan as well, therefore making it unnecessary to provide an additional fan which would take up additional space. The propeller type fan, in accordance with my invention, is more efficient in this arrangement than the conventional centrifugal type fan, since it draws a larger quantity of air longitudinally through the generator 6 and through the slip clutch parts, thereby rapidly dissipating heat losses which are developed.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. A power transmitting apparatus having maximum efficiency for a predetermined overall length, comprising, in combination, a dynamoelectric machine, a driving member secured to the rotor of said machine, a clutch which comprises a cylindrical flange supported by a spider-like member secured to and extending radially outwardly from said driving member and a driven member which is adapted for driving engagement with said cylindrical flange, the arms of said spider-like member being substantially coextensive longitudinally with said cylindrical flange and being in the form of propeller blades for propelling air longitudinally through the openings of said spider-like member, said dynamo electric machine having longitudinal ventilating openings which are in communication and in confronting relationship with said arms of said spider-like members to afford mutual and intensive cooling of both said dynamo electric machine and said clutch.

2. A power transmitting apparatus having maximum efficiency for a predetermined overall length, comprising, in combination, a dynamoelectric machine, a driving member secured to the rotor of said machine, a clutch which comprises a spider-like member secured to and extending radially outwardly from said driving member and a driven member which is adapted for driving engagement with said spider-like member, the arms of said spider-like member being in the form of propeller blades for propelling air longitudinally through the openings of the spider-like member, said blades being of "airfoil" cross-section said dynamo electric machine having longitudinal ventilating openings which are in communication and in confronting relationship with said arms of said spider-like members to afford mutual and intensive cooling of both said dynamo electric machine and said clutch.

3. A power transmitting apparatus having maximum efficiency for a predetermined overall length, comprising, in combination, a dynamoelectric machine, a driving member secured to the rotor of said machine, a clutch comprising a cylindrical flange supported by a spider-like member secured to and extending radially outwardly from said driving member and a driven member which is adapted for driving engagement with said cylindrical flange, the arms of said spider-like member being in the form of propeller blades disposed within the longitudinal confines of said cylindrical flange for propelling air longitudinally through the openings of said spider-like member, said blades being of "airfoil" cross-section and being inclined with respect to the plane of said spider-like member, the degree of inclination decreasing in a radially outward direction of said spider-like member said dynamo electric machine having longitudinal ventilating openings which are in communication and in confronting relationship with said arms of said spider-like members to afford mutual and intensive cooling of both said dynamo electric machine and said clutch.

4. A power transmitting apparatus having maximum efficiency for a predetermined overall length, comprising, in combination, a dynamoelectric machine, a driving member secured to the rotor of said machine, a clutch comprising a spider-like member secured to and extending radially outwardly from said driving member and a driven member which is adapted for driving engagement with said spider-like member, the arms of said spider-like member being in the form of propeller blades for propelling air longitudinally through the openings of said spider-like member, said dynamo electric machine having longitudinal ventilating openings which are in communication and in confronting relationship with said arms of said spider-like members to afford mutual and intensive cooling of both said dynamo electric machine and said clutch, stationary guide vanes located adjacent the intake side of said propeller blades and in communication with said longitudinal openings through said dynamo electric machine to guide incoming air axially into the path of said blades.

5. A power transmitting apparatus having maximum efficiency for a predetermined overall length comprising, in combination, a dynamo-electric machine, a driving member secured to the rotor of said machine, a slip clutch comprising a spider-like driving member having a cylindrical friction element supported thereby and a driven member having friction shoes therebetween and spring means normally holding said slip clutch members in driving engagement but allowing disengagement under the action of centrifugal force of the spider-like driving member thereby providing a substantially constant rotational speed of said driven member, the arms of said spider-like driving member being in the form of propeller type fan blades disposed within the longitudinal confines of said cylindrical friction element, said dynamo electric machine having longitudinal ventilating openings which are in communication and in confronting relationship with said arms of said spider-like members to afford mutual and intensive cooling of both said dynamo electric machine and said clutch.

6. A power transmitting apparatus having maximum efficiency for a predetermined overall length comprising, in combination, a dynamo-electric machine, a driving member secured to the rotor of said machine, a slip clutch comprising a spider-like driving member having a cylindrical friction element supported thereby and a driven member having friction shoes therebetween and spring means normally holding said friction shoes in driving engagement with said cylindrical friction element but allowing disengagement under the action of centrifugal force of the spider-like driving member thereby providing a substantially constant rotational speed of said driven member, the arms of said spider-like driving member being disposed within the longitudinal confines of said cylindrical friction element and being in the form of propeller type fan blades of "streamlined" cross-section for propelling air longitudinally through the openings of said spider-like member, said dynamo electric machine having longitudinal ventilating openings which are in communication and in confronting relationship with said arms of said spider-like members to afford mutual and intensive cooling of both said dynamo electric machine and said clutch.

7. A power transmitting apparatus, comprising, in combination, a driving member, a clutch comprising a spider-like member secured to and extending radially outwardly from said driving member and a driven member which is adapted for driving engagement with said spider-like member, the arms of said spider-like member being in the form of propeller blades for propelling air longitudinally through the openings of said spider-like member, a generator which is driven by a shaft extending from said driving member which generator includes an armature which is mounted about said shaft and which is in yieldable frictional engagement therewith so as to allow slip between said shaft and armature in the event of abnormal acceleration of said driving member, said dynamo electric machine having longitudinal ventilating openings which are in communication and in confronting relationship with said arms of said spider-like members to afford mutual and intensive cooling of both said dynamo electric machine and said clutch.

8. A generator set for an airplane, comprising, in combination, a driving member which is driven by the main engine of the airplane, a generator including a rotor which is in yieldable frictional driving engagement with said driving member in order to provide for slip between said driving member and rotor in the event of excessive acceleration of said driving member, a slip clutch comprising a spider-like driving member having a cylindrical flange secured therearound and a driven member having friction shoes therebetween and spring means normally holding said friction shoes and said cylindrical flange portion in driving engagement but allowing disengagement under the action of centrifugal force of the spider-like driving member thereby providing a substantially constant rotational speed of said driven member, the arms of said spider-like driving member being in the form of propeller type fan blades disposed within the longitudinal confines of said cylindrical friction element, said dynamo electric machine having longitudinal ventilating openings which are in communication and in confronting relationship with said arms of said spider-like members to afford mutual and intensive cooling of both said dynamo electric machine and said clutch.

9. A generator set for an airplane, comprising, in combination, a housing which is adapted to be secured to the main engine of the airplane, said housing having a plurality of ventilating openings, a shaft which is driven by said main engine and which extends through said housing, a generator within said housing including a rotor which is in yieldable frictional driving engagement with said shaft in order to provide for slip between said shaft and rotor in the event of excessive acceleration of said driving member, a slip clutch comprising a spider-like driving member and a driven member having friction shoes therebetween and spring means normally holding said driving and driven members in driving engagement but allowing disengagement under the action of centrifugal force of the spider-like driving member thereby providing a substantially constant rotational speed of said driven member, the arms of said spider-like driving member being in the form of propeller type fan blades, said generator having longitudinal ventilating openings which are in communication and in confronting relationship with said arms of said spider-like members to afford mutual and intensive cooling of both said generator and said clutch, a second generator which is contained within said housing and which is driven by said driven member, thus being run at substantially constant speed, said second generator including a rotor having a plurality of longitudinal holes extending therethrough for ventilation, the cooling path of said second generator being separate and independent from that of the first.

EDWIN E. ARNOLD.